United States Patent [19]

Evansen

[11] 3,909,515

[45] Sept. 30, 1975

[54] FACSIMILE SYSTEM WITH MEMORY

[75] Inventor: Arthur W. Evansen, Lomita, Calif.

[73] Assignee: The Magnavox Company, Torrance, Calif.

[22] Filed: Mar. 27, 1973

[21] Appl. No.: 345,309

[52] U.S. Cl. ................................ 178/6; 178/DIG. 3

[51] Int. Cl. ............................................ H04n 1/02

[58] Field of Search ............................ 178/DIG. 3, 6

[56] References Cited

UNITED STATES PATENTS

| | | | |
|---|---|---|---|
| 3,347,981 | 10/1967 | Kagan | 178/DIG. 3 |
| 3,588,329 | 6/1971 | Monk | 178/DIG. 3 |
| 3,622,695 | 11/1971 | Rugaber | 178/6 |
| 3,643,016 | 2/1972 | Dattilo | 178/6 |
| 3,643,019 | 2/1972 | Beltz | 178/DIG. 3 |
| 3,646,256 | 2/1972 | Jacob et al. | 178/6 |
| 3,723,641 | 3/1973 | Heinrich et al. | 178/6 |

*Primary Examiner*—Howard W. Britton
*Assistant Examiner*—Michael A. Masinick
*Attorney, Agent, or Firm*—Ellsworth R. Roston

[57] ABSTRACT

A facsimile system for reproducing a picture having a multiplicity of lines typically including dense areas of a first type of data bounded by significant areas of a second type of data. A scanner views a particular line of the picture and provides a first stream of data having digital characteristics dependent upon the first and second types of data in the line viewed. A transmitter includes a first memory for storing the first stream of digital data and means for ascertaining the addresses in the memory which correspond to the first and last addresses of each of the dense areas of the data. The transmitter then transmits on a communication channel the first and last addresses followed by the data therebetween for each of the dense areas. A receiver connected to the channel includes a second memory for storing the transmitted data between memory addresses corresponding to the transmitted addresses so that a second stream of data similar to the first stream of data is constructed in the second memory. A printer is responsive to the second stream of data in the second memory to reproduce a line of the picture.

27 Claims, 5 Drawing Figures

FACSIMILE SYSTEM WITH MEMORY

BACKGROUND OF THE INVENTION

1. Field of the Invention

This invention relates generally to facsimile systems involving white space skipping, and more specifically to such systems using a memory for storing the data in a scan line.

2. Description of the Prior Art.

Facsimile systems of the prior art have reproduced a picture by scanning the picture to determine the position of light areas and dark areas therein. This information has been digitized and transmitted, typically, over a telephone line to a distant receiver wherein the picture has been reproduced.

To facilitate the scanning operating, the picture has been divided into a plurality of scan lines, each containing a plurality of addresses. As a particular line has been scanned, significant areas of black and white have been detected. Typically the detection of black at a particular address in the picture has been encoded as a digital "1" while the detection of white has been encoded as a digital "0".

In some systems the scanning beam has traveled at a constant velocity across the scan line so that the digital baseband of 0's and 1's has corresponded to the position of the light and dark areas along the scan line. Using this digital information, the receiver has printed a single line of the reproduced picture. In a similar manner, successive lines of the picture have been printed from the digital data corresponding to the respective scan lines of the picture.

Some systems have taken advantage of the fact that the individual black data and white date typically occur in groups of adjacent addresses. In other words, if one address of the scan line includes black data, it is highly probable that the next address on the scan line will also contain black data. Conversely, it is less probable that a single bit of black data will occur by itself or that, for example, 15 bits of black data will occur uninterrupted by white data. Considering these probabilities, systems have been constructed wherein the most probable runs of black data have been encoded with the shortest code and the least probable runs of black data have been encoded with the longest code. This procedure, which is commonly referred to as run length encoding, generally reduces the time for transmitting a picture.

Errors in facsimile transmission, which are generally attributed to the poor quality of the telephone line, have had a particularly adverse effect upon the quality of pictures reproduced by the run length encoding systems. For exemple, if there is an error in one of the short codes, it may affect several addresses along the print line of the reproduced picture. Furthermore, since the information is both positional and graphic, a given error may have two effects. It may print an accurate data bit at the wrong location, or an inaccurate data bit at the right location.

It has been realized that the accuracy of the graphic information or dense data is of greater importance than the accuracy of the positional information. Therefore, systems have been devised for scanning at a fast rate of speed to obtain positional information and scanning at a slow rate of speed to obtain graphic information. Such systems have given rise to what is generally called "white space skipping" wherein the addresses defining significant areas of dense data have been determined at a fast rate of speed and then the dense area has been scanned at a slow rate of speed to obtain the graphic data.

For example, in a particular beam hopping system, it has been shown that a given scan line containing for example two areas of dense black data, each defined by a first black address and a last black address, can be scanned in the following manner. First, the scan line traveling at a fast rate of speed would pass through the first dense area until it reached the first black address of the second dense area. As the beam traveled through the first dense area, both the first black address and the last black address defining that area would be transmitted. Then, after reaching the first black address of the second dense area, the beam would be moved to a fast rate of speed back to the first black address of the first dense area. At this point, the direction of the beam would again be reversed to traverse the first dense area. This second traversal of the first dense area has typically been accomplished at a slow rate of speed to accurately obtain the dense data therein. Upon reaching the last black address of the first dense area, the speed of the beam would again be increased and the scanning of the second dense area would proceed in a similar manner.

Such a system for transmitting the first and last black addresses of a dense area followed by the transmission of the data therebetween has been desirable since the errors in transmission have had less of an effect upon the quality of the reproduced picture. For example, if one of the addresses transmitted is incorrect, the accurate data is merely shifted a small distance on the reproduced picture. To a person viewing the reproduced picture, such an error may not be as perceptable. On the other hand, the graphic information which is of more importance, is obtained at a slow and therefore accurate rate of speed.

Unfortunately, this beam hopping system has not been economically implemented. As noted, the positioning of the beam at different points in the scan line is particularly critical. For this reason, beam positioning apparatus of considerable size and quality has been used to perform this very important function. This apparatus has been understandably expensive so that the beam hopping systems have been impractical for general use.

SUMMARY OF THE INVENTION

In the present invention the scanning beam travels at a constant rate of speed through an entire scan line. There is no beam hopping nor problems with accurately locating the beam at a given address along the scan line. Thus, the physical limitations of the beam hopping system are avoided.

The present invention includes a transmitter and a receiver typically communicating through a telephone line. In the transmitter, the data obtained by scanning the scan line can be clocked into a serial static MOS memory having an address for each of the bits of data along the scan line. The digital 1's and 0's therefore occur in memory at addresses corresponding to the addresses of the data along the scan line.

As the line is being scanned, the transmitter can transmit a burst signal to the receiver to herald the arrival of digital data. Then, as the memory is being loaded, the first black address of the first dense data area can be determined and transmitted at a slow rate of speed to the receiver. During this slow transmission, the memory in the transmitter can be shifted at a fast rate of speed to ascertain the last black address of the first area and the first black address of the second area, if any. Then the last black address of the first area can be transmitted at a slow rate of speed while the memory is shifted at a fast rate of speed so that the data of the first dense area is moved to the exit of the memory.

Following the transmission of the first and last black addresses, the dense data therebetween can be clocked from the memory at a slow rate of speed. To insure that only this data is clocked from the memory, a serial comparator can be provided to clock the data from the memory until the address at the exit of the memory corresponds to the last black address. At this point, the system can iterate to ascertain and transmit the limiting addresses and the data of the second and subsequent dense data areas on the particular scan line. When there are no further dense data areas, the transmitter can transmit another burst signal to alert the receiver to the arrival of data from the next scan line.

The receiver can respond to the receipt of the burst signal by storing the first black address of the first area and the following last black address of the first area. A memory in the receiver can be appropriately clocked to receive the following dense data between these addresses. Similarly, the data in the second and subsequent dense data area, if any, can be loaded into memory between the associated first and last black addresses. The memory can also be loaded with 0's between the dense data areas so that the memory is reconstructed to correspond to the positional and graphic information in the scan line. From the memory constructed in this manner, a single line of the reproduced picture can be printed.

The provision of the memory in the white space skipping facsimile system of the present invention is of particular importance. Since the data is loaded into memory and retained in the system, it can be processed to perform many desirable functions. For example, a subsequent scan line which contains the same information as the preceding scan line can be printed by merely transmitting a code indicative of that relationship. Even if the scan lines differ to some small extent, a code can be provided, for example, in the burst signal, to provide slight modifications in the subsequently printed line.

The system of the present invention can have a transmission time equal to or better than the systems of the prior art since the scanning can occur at a relatively constant and fast rate of speed. Furthermore, the present system is less subject to error since there are no problems associated with the accurate positioning of the scanning beam. Furthermore, as previously noted, the undesirable effects of the errors are considerably less. The system can be implemented with less expensive hardware so that it is highly practical for general use. The system also provides for an ascension check whereby if the number expressed by the last black address is not higher than the number expressed by the corresponding first black address, the line may not print.

These and other features and advantages of the present invention will be more apparent with a detailed description of the preferred embodiments illustrated in the associated drawings.

DESCRIPTION OF PREFERRED EMBODIMENTS

Figure 1:
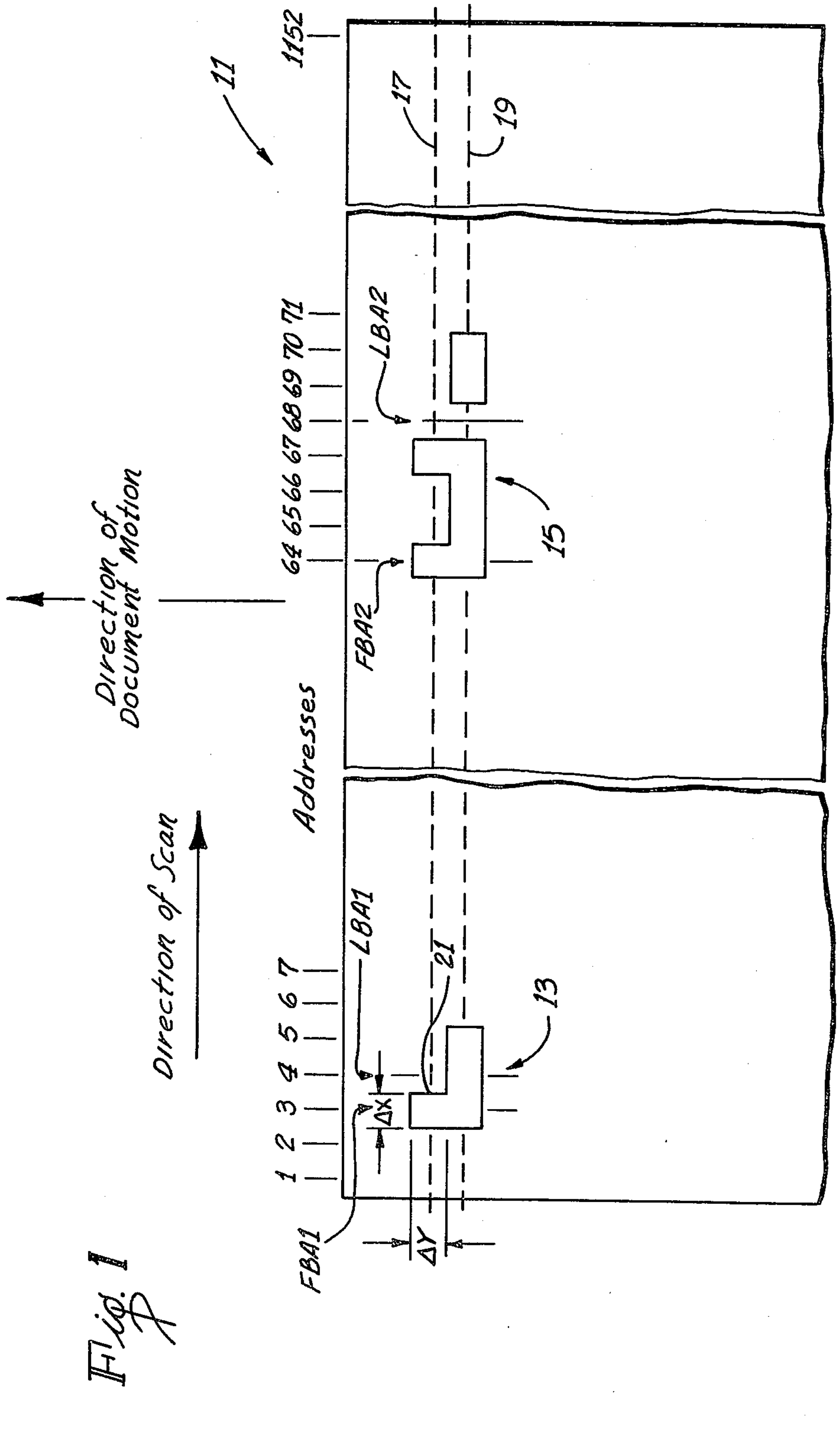
FIG. 1 is a picture including dense data areas which can be advantageously reproduced by the facsimile system of the present invention.

A document or picture is illustrated generally in FIG. 1 and designated by a reference numeral 11. The picture may include printed matter, photographs, or generally any representation of dark areas and light areas. For example, the picture 11 includes a first dense area of data 13 and a second dense area of data 15. The areas 13 and 15 are typically separated by a significant white area having some minimum length.

The picture 11 can be separated into a plurality of scan lines including a first scan line 17 and a second scan line 19. These scan lines 17 and 19 typically extend horizontally across the picture 11 and have a height or vertical dimension $\Delta Y$, such as 0.010 inches.

The picture 11 can also be divided into a plurality of addresses corresponding to positions along the scan lines 17 and 19. For example, on a typical picture or document having a width of 8½ inches, the number of addresses may be 1,152 so that address 1 would correspond to one end of the scan line 17, 19 and the address 1,152 would correspond to the opposite end of scan line 17, 19. Along a dimension of 8½ inches, 1,152 addresses would provide each of the addresses with a width or horizontal dimension $\Delta X$ of 0.007 inches. Each $\Delta X$ and $\Delta Y$ defines an element 21 of the picture 11 which can be appropriately located on the picture 11 with respect to its scan line and address. For example, the particular element 21 corresponds to the scan line 17 and the address 3. The data in each of the elements 21 can be expressed as a digital 1 if the element is black and a digital 0 if the element is white.

Each of the addresses can be expressed as a digital word containing the number of bits necessary to express the highest address number. For example, if the highest address number is 1,152, the digital words would typically consist of 11 bits. It is this number of bits in each of the address words which is typically used to define the minimum length of a significant white area separating the dense areas of data, such as 13 and 15. As will be described subsequently, a dense data area can be reproduced by transmitting its first and last black addresses followed by the data therebetween. In such a system, a white area of length less than the length of two digital address words can be transmitted in a shorter length of time as data than could the two address words which would otherwise be needed to describe an additional dense area of data. Thus, if the highest numbered address is 1,152, the address words would typically include 11 bits and a significant run of white might desirably be defined by not less than 22 bits.

Referring specifically to the first scan line 17, it will be noted that the first dense data area 13 is defined by a first black address numbered "3" and a last black address numbered "4". Throughout the remainder of this description, these addresses will be respectively referred to as FBA1 and LBA1. Similarly, the first black address of the second dense area of data 15 is numbered 64 and the last black address is numbered 68. These addresses will hereinafter be referred to as FBA2 and LBA2.

Figure 2:
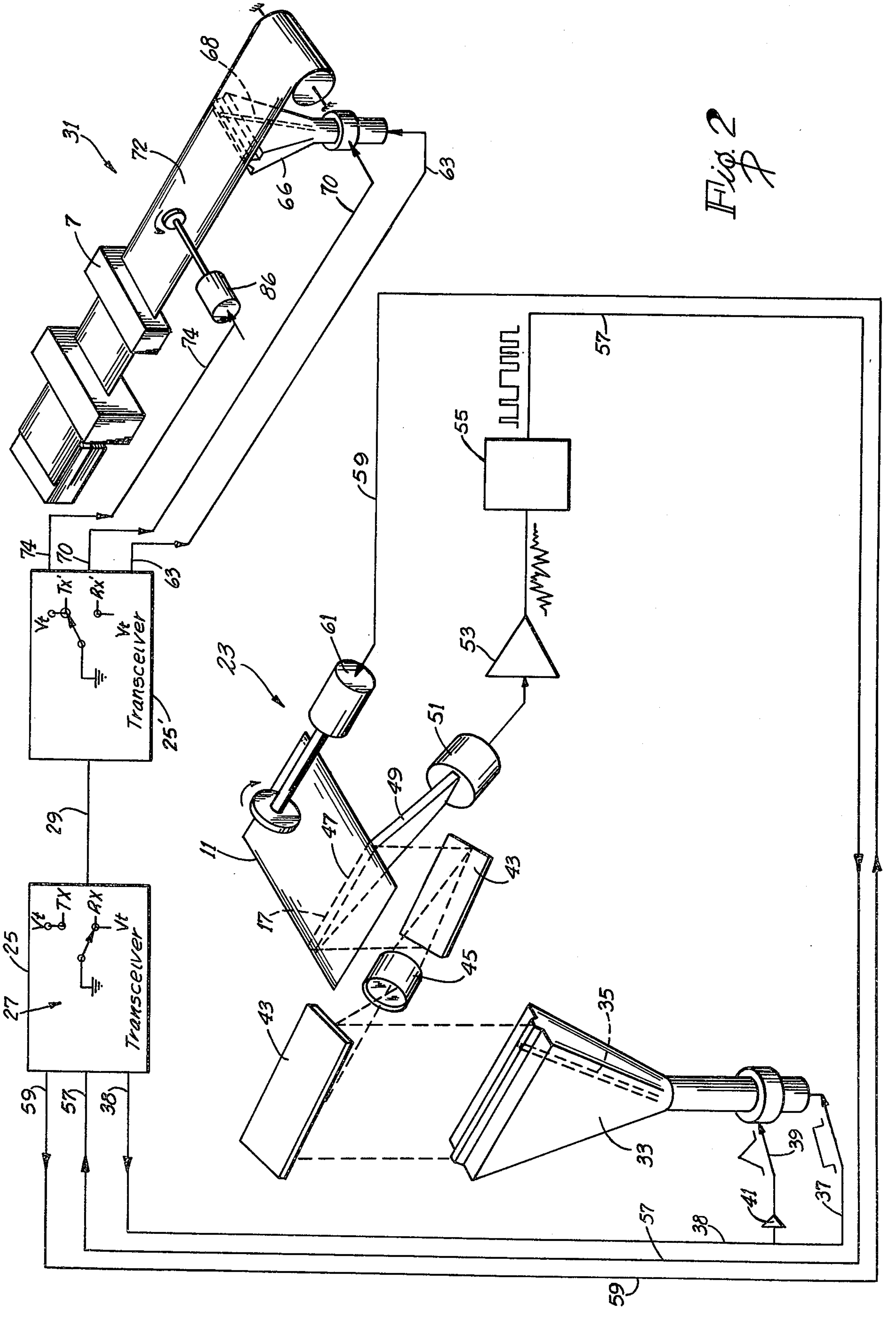
FIG. 2 is a block diagram of one embodiment of the present invention including a transmitter and a receiver.

Referring now to FIG. 2, a scanning apparatus, which is shown generally at 23, can be controlled by a first transceiver 25 containing a transmit/receive switch 27. The receiver terminal RX of the switch 27 is grounded so that the transceiver 25 is placed in the transmit mode of operation. The transceiver 25 typically communicates over a telephone line 29 with a second transceiver 25' at a distant location. This second transceiver 25' may be substantially the same as the first transceiver 25 so that similar components of the second tranceiver 25' will hereinafter be designated with the same reference numerals followed by a prime. The transceiver 25' contains a transmit/receive switch 27' having a transmit terminal TX' which is grounded to place the transceiver 25' in the receive mode of operation. Throughout the remainder of the description, the transceivers 25 and 25' will be referred to as the transmitter 25 and the receiver 25', respectively. To complete the facsimile system, the receiver 25' can be connected to control a printing apparatus shown generally at 31.

A typical scanning apparatus 23 may include a fibreoptic cathode ray tube (CRT) 33 providing a narrow scanning beam 35 of substantially constant intensity in response to a signal on an unblanking conductor 37. The scanning beam 35 is typically deflected along a straight line in response to a ramp signal provided by a deflection amplifier 41 on a conductor 39. Both the ramp and unblanking signals can be provided simultaneously by connecting the conductors 37 and 39 to a common conductor 38. This type of CRT is sometimes referred to as a flying spot scanner.

The scanning beam 35 can be reflected by a pair of mirrors 43 so that it shines on a document such as the picture 11. In a preferred embodiment, a focusing lens 45 is disposed between the mirrors 43. On the picture 11, the scanning beam 35 will appear as a dot 47 moving at a substantially constant velocity across a particular scan line, such as the scan line 17.

The document 11 reflects the dot 47 through a light pipe 49 at a brightness dependent upon the light characteristics of the picture 11 at the point of reflection. For example, if the dot 47 is reflected by a dark area, the intensity of the reflected light will be relatively low; whereas, if the dot 47 is reflected by a light area, the intensity of the reflected light would be relatively high. This intensity is sensed by a photo-multiplier 51 and amplified by a video-amplifier 53 to provide an analog data signal. The analog data signal is typically sampled in a digitizer 55 to provide digitized data on a conductor 57.

After a particular scan line 17 has been scanned, the picture 11 can be stepped by a control signal on a conductor 59 which actuates a stepper motor 61. Each step of the motor 61 moves the document the distance $\Delta Y$ to expose the nest scan line 19 to the scanning beam 35.

As will be described subsequently in greater detail, the transmitter 25 processes the scan data on the conductor 57 and transmits the FBA, the LBA, and the data therebetween for each of the density data areas 13 and 15. The receiver 25' processes this information to form a digital data signal corresponding to that on the conductor 57. This data signal is introduced on a conductor 63 to the printing apparatus 31. The printing apparatus 31 typically includes a fibre-optic CRT 66 having a light beam 68 which is modulated by the signal of the conductor 63 and deflected by a ramp signal on a conductor 70.

A sheet of dry silver film 72 can be moved into proximity with the CRT 66 so that the light beam 68 exposes a line on the film 72. In response to a signal on a conductor 74, a stepper motor 86 moves the film 72 so that the following scan data on the line 63 exposes an adjacent line on the film 72. If the film 72 is provided as a continuous roll, it can be appropriately cut by a cutter 77.

The operation of the transmitter 25 will now be described with reference to the block diagram of FIG. 3 and the timing/action flow chart of FIG. 4. This flow chart of FIG. 4 illustrates a plurality of arrows which are positioned with respect to time as indicated by the modern clock periods at the top of the chart. The arrows are arranged in two groups which are separated by a baseband 67 showing the information transmitted on the telephone line 29 in response to the scanning of the particular scanning lines 17 and 19 of the picture 11. The arrows above the baseband 67 are related to operations of the transmitter 25 while the arrows below the baseband 67 are related to operations of the receiver 25'.

Preliminary to a detailed discussion of the transmitter 25, it may be helpful to discuss the characteristics of some of its components. Generally speaking, the transmitter 25 contains a clock divider 69 providing pulse streams at various clock rates and a program counter C2 providing various reference points for system control. The transmitter 25 also includes a memory 71 (lower right-hand corner of FIG. 3) for receiving the scanned data from the scanning apparatus 23 (FIG. 2). Registers R1, R2, and R3 cooperate with a memory address counter C1 to process the data in the memory 71 for transmission through a modem 73. The counter C1 is connected to provide for parallel transfer of its contents into the registers R1 and R3. Register R1 is similarly connected to register R2 which is similarly connected to the counter C1. The contents of the counter C1 are ascertained in a decoder 179 which provides output signals on lines 181, 183, and 185 when the counter C1 equals 1,152, 1,153, and 1,200, respectively. The processing of the data is performed in accordance with signals from a programmer shown generally at 75.

The transmitter 25 also includes a white space counter C3 having a reset terminal and a clock terminal. The counter C3 provides an output signal on a line 76 when the count is equal to the number of bits, such as 22, in a significant run of white data.

More specifically, the clock divider 69 can be made responsive to a crystal controlled oscillator 76 to provide pulse streams at fast, medium and slow frequencies such as those noted respectively on the conductors 78, 80 and 82, The program counter C2 can provide a signal on the conductor 84 when the number of slow clock pulses corresponds to the number of bits, such as 11, at an address word. Similarly, the program counter C2 can provide a signal on a conductor 86 when the number of slow clock pulses is equal to the number of white spaces, such as 22, corresponding to a significant run of white data. Finally, the program counter C2 can provide a signal on a conductor 88 when the number of slow clock pulses is equal to the number of bits, such as 48, in a burst signal.

The memory 71 can be a static MOS memory capable of receiving the number of bits corresponding to the number of addresses across the picture 11. For example, memories commonly available with a 1,200 bit capacity can accommodate 1,152 addresses. In a preferred embodiment, the memory 71 is manufactured by Texas Instruments, Inc. and marketed under the catalog number TMS3003LR.

The registers R1, R2 and R3 are universal storage registers of the type manufactured by Texas Instruments under the model number SN7495N, for example. With reference to register R3, it will be noted that these registers preferably have a "clock" terminal 77 which can be locked to serially shift data into a "data in" terminal 79. The registers R1, R2 and R3 are also provided with a "load parallel" terminal 81 which can be clocked to transfer data in parallel.

The programmer 75 may include 12 dc flip flops which have been designated with consecutively odd numerals between 83 and 105 inclusive. The flip flop 83 provides an output signal on a conductor 107 during a first time period which will hereinafter be referred to as T1. Similarly, the flip flop 85 has an output conductor 109 providing a signal T2. The flip flops 87 and 89 have respective output conductors 111 and 113 providing signals during time periods T3 and T4, respectively. The designations T1, T2, T3 and T4 will be used herein to refer not only to particular time periods, but also to control signals which occur only during those respective time periods.

When the transmitter 25 is in a stand-by mode of operation, none of the signals T1, T2, T3 and T4 are provided and a stream of logic 1's are enabled through an AND gate 80 for transmission through the modem 73 to the receiver 25'. From this stand-by mode of operation the transmitter 25 can be activated by pressing a push button 90 to initially provide a "reset" signal on a conductor 114. This signal is desirable to clear the flip flops 83, 85, 87, 89, 99, 103 and 105 through OR gates designated by consecutively odd reference numerals between 119 and 131, respectively. The signal on line 114 also resets the program counter C2 and the white space counter C3 through OR gates 133 and 135, respectively.

The pressing of the push button 90 initially resets the transmitter 25 as indicated and after a short delay provides a "start" signal on a conductor 115. This start signal is passed through an OR gate 117 to set the flip flop 83 and provide the signal T1 on the conductor 107.

Figure 3:
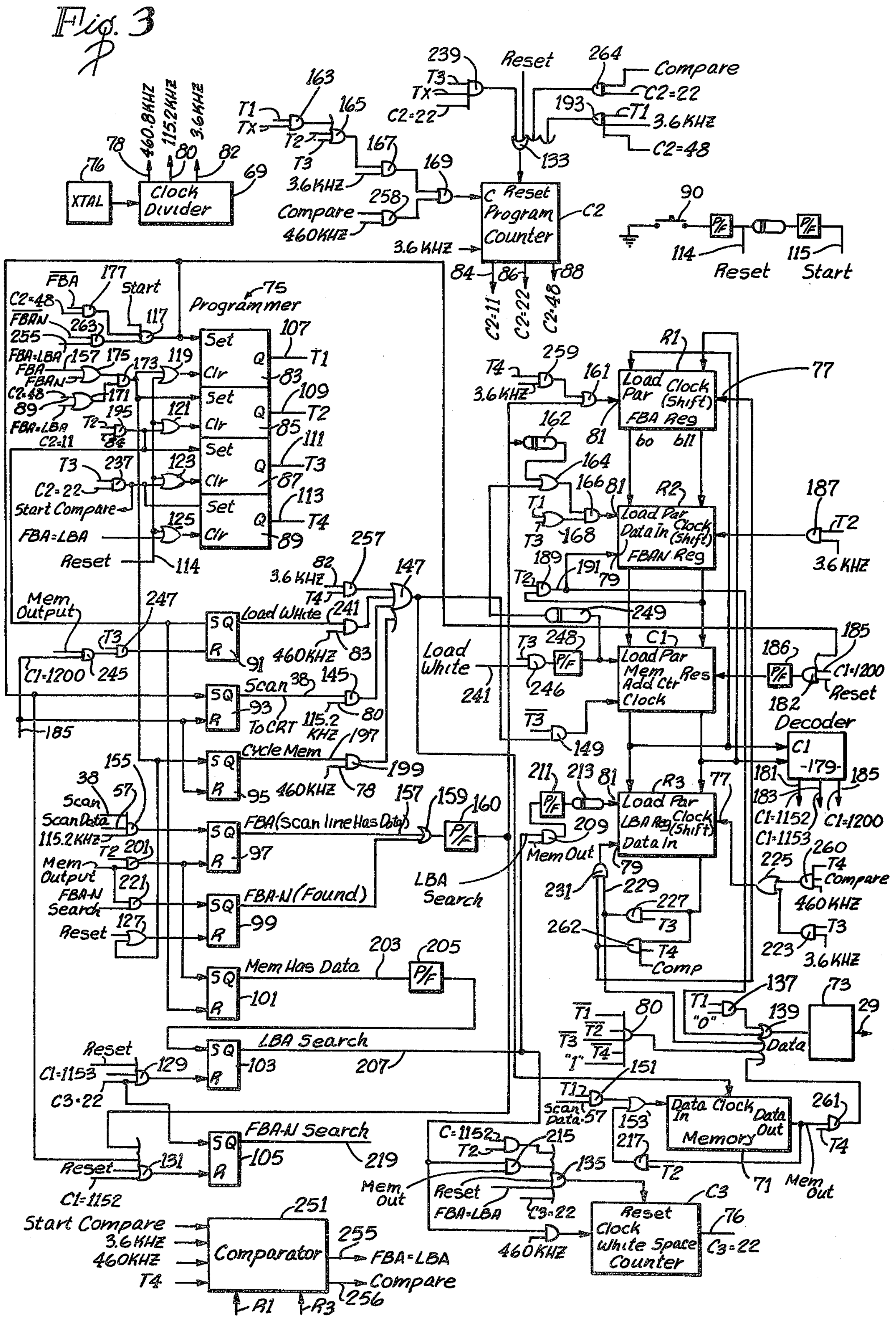
FIG. 3 is a block diagram of the transmitter illustrated in FIG. 2.
Figure 4:
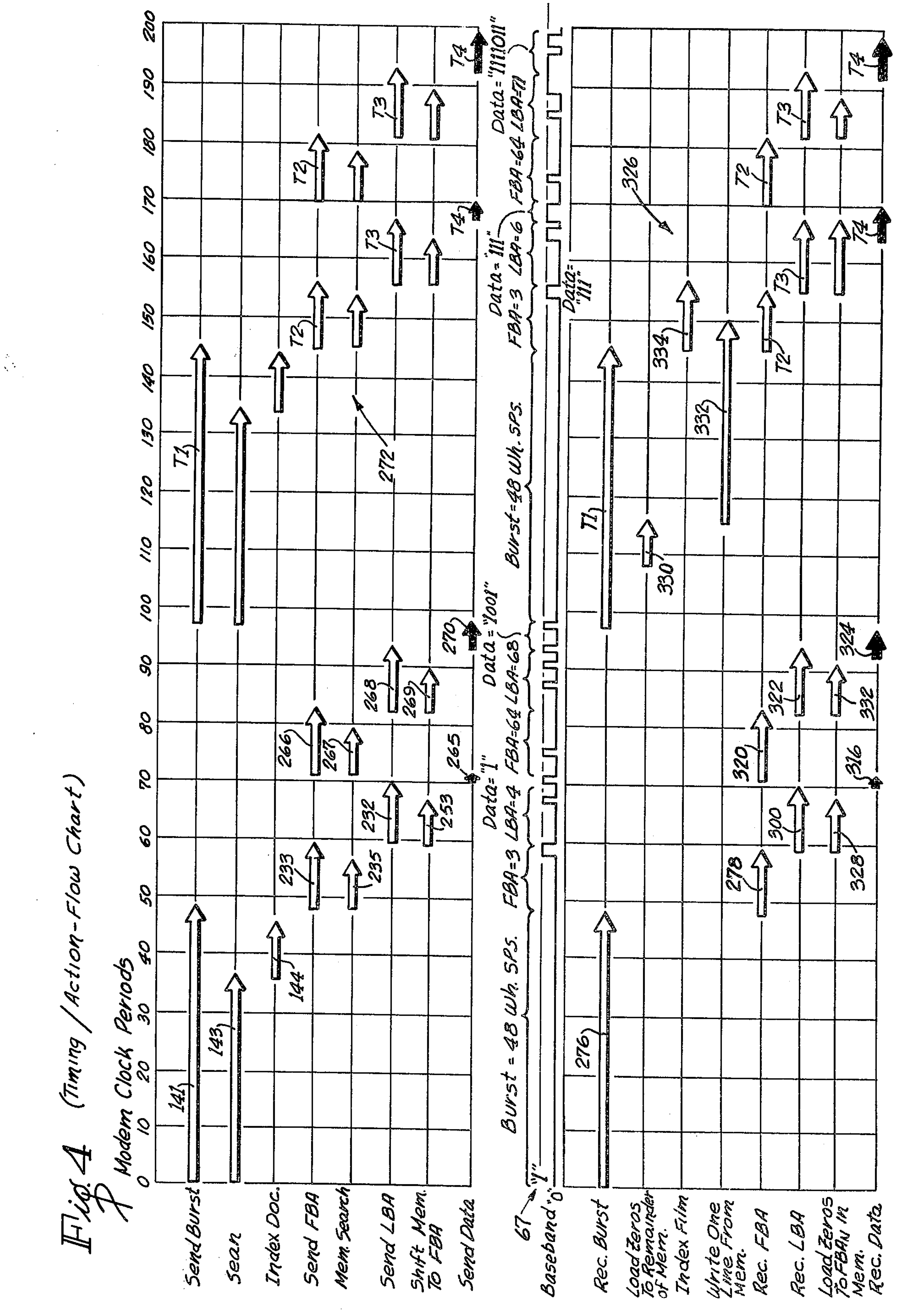
FIG. 4 is an action/time flow chart illustrating the progressive operations of one embodiment of the present invention.

The signal T1 inhibits the AND gate 80 and enables an AND gate 137 illustrated in FIG. 3 between the register R3 and the memory 71. The AND gate 137 also receives inputs of logic 0's which are clocked through an OR gate 139 into the modem 73 for transmission. These logic 0's comprise a burst signal which may have a length of 48 bits as shown by an arrow 141 in FIG. 3. The burst signal which is transmitted at the beginning of each scan line, alerts the receiver 25' that addresses and data may be following.

The signal from the OR gate 117 can also set the flip flop 93 to provide a "scan" signal on the common conductor 38. It will be recalled that the conductor 38 controls the operation of the CRT 33 in FIG. 2. The scanning of the line 17 on the picture 11 is illustrated by the arrow 143 in FIG. 4. The scan signal enables an AND gate 145 so that clock pulses, preferably at the medium clock rate, are passed through a master OR gate 147 to clock the memory 71. Simultaneously, these clock pulses are introduced through an AND gate 149 to clock the memory address counter C1. It will be noted that the AND gate 149 is enabled during all time periods other than T3. As the memory 71 is clocked, the scan data on the conductor 57 (FIG. 2) is introduced through an AND gate 151 which is enabled by the timing signal T1. This scan data passes through an OR gate 153 into the memory 71.

With the scan signal on line 38, any digital 1's appearing in the scan data on line 57 can be clocked through an AND gate 155 to set the flip flop 97. This, of course, is evidence of the fact that there is data on the particular line which is being scanned.

This particular bit of data also corresponds to the first block address of the first dense data area. Therefore, when the flip flop 97 is set, a signal "FBA" appears on an output line 157 which is connected through an OR gate 159 to activate a pulse former 160. This pulse former 160 provides a pulse which is introduced through an OR gate 161 to the load parallel terminal 81 of the register R1. When the signal FBA appears on the output line 157, it enables the register R1 so that the contents of the counter C1 are loaded in parallel to the register R1. Since the first black bit of data enables the FBA signal at the time its address appears in the counter C1, it is apparent that the register R1 has been loaded with FBA1.

The pulse from the pulse former 160 is detained in a delay 162 and passed through an OR gate 164 to provide an input to an AND gate 166. The AND gate 166 is enabled by the signal T1 passing through an OR gate 168 and the resulting pulse is introduced to the load parallel terminal 81 of the register R2. In this manner, the contents of register R1 (FBA1) can be shifted in parallel to the register R2.

Referring now to the circuitry associated with the program counter C2, it is apparent that with the transmitter 25 in the transmit mode, the signal T1 enables an AND gate 163. This provides a signal which passes through an OR gate 165 to enable an AND gate 167. This permits clock pulses, preferably at the slow clock rate, to pass through an OR gate 169 to clock the counter C2. When the counter C2 has reached the count of 48 corresponding to the length of the burst signal, a signal will appear on the conductor 88 as previously noted. The signals T1 and the signal "C2 = 48" can be combined in an AND gate 193 to provide a pulse through the OR gate 133 to reset the counter C2.

In the programmer, the signal C2 = 48 on the conductor 88 will pass through an OR gate 171 to provide an input to an AND gate 173. The FBA signal on line 157 will pass through an OR gate 175 to provide another input to the AND gate 173. This will enable a signal which simultaneously clears the flip flop 83 and sets the flip flop 85. In this manner, the signal and corresponding period T1 can be terminated and the signal and corresponding time period T2 can be initiated.

With the termination of the signal T1, the AND gate 137 is no longer enabled so that the burst signal terminates with 48 zeros.

Briefly, it might be of interest to note that if, at the end of 48 counts by the counter C2, there has been no FBA signal on the line 157, it would have indicated that there was no data on the particular line scanned. Under these circumstances, an AND gate 177 would have been enabled to provide a signal through the OR gate 117 to set the flip flop 83. In this manner, the transmitter 25 could have been retained in the time period T1.

At the termination of the scan, the picture 11 could have been approximately indexed by a signal on the conductor 59 (FIG. 2) as illustrated by the arrow 144 in FIG. 4. Also, at the completion of the scan, when the counter C1 reached 1,200, the decoder 179 would have provided the output signal C1 = 1,200 on the line 185. This signal could have been used to reset the flip flop 93 and terminate the scan signal. The signal C1 = 1,200 could also have been introduced through an OR gate 182 to initiate a pulse from a pulse former 186 for resetting the counter C1 to 0.

Proceeding with the example in progress, it will be recalled that dense data had been detected, its FBA1 had been stored in registers R1 and R2, the time period T1 had been terminated, and the time period T2 had been initiated. During the time period T2, several functions can be advantageously performed in the transmitter 25. For example, it may be desirable to transmit FBA1 from the register R2 and simultaneously reload that address into the register R2. It may also be desirable to search the memory 71, preferably at the fast clock rate, to find not only LBA1 but also FBA2, if there is one.

The transmitting of FBA1 from the register R2 can proceed in the following manner. The signal T2 can be used to enable a pair of AND gates 187 and 189 associated with the register R2. The enabling of the AND gate 187 permits clock pulses, preferably at the slow rate, to clock the register R2 so that its contents are introduced through the AND gate 189 onto a conductor 191. The conductor 191 is connected to the "data in" terminal 79 of the register R2 so that its contents are serially loaded back into the register. The conductor 191 can also be connected through the OR gate 139 to the modem 73 so that its contents are transmitted on the telephone line 29. This transmitting of FBA1 is illustrated in FIG. 4 by the arrow 233.

Since the counter C2 was reset at the end of the time period T1, it started counting from zero at the beginning of the time period T2. When the counter C2 again counts to 11, it provides a signal on the line 84 which can cooperate with the signal T2 to enable an AND gate 195 which clears the flip flop 85, and terminates the time period T2. With the termination of the signal T2, the AND gate 187 is no longer enabled so that it is apparent that the register R2 has been clocked only 11 times.

As noted, it is desirable to cycle memory during the time period T2 to search for not only LBA1 but also FBA2 if there is one. This search of memory preferably takes place within the time period of the 11 slow clock pulses. This can be accomplished by cycling the memory 71 at the fast clock rate. The signal from the AND gate 173 which initially set the flip flop 85 can also be used to set the flip flop 95. This provides an output "cycle memory" signal on a line 197 which enables an AND gate 199. This permits the fast clock pulses from the line 83 to pass through the AND gate 199 and the OR gate 147 to clock the counter C1 and the memory 71. As the memory 71 is being clocked, its contents can be reloaded through an AND gate 217 and the OR gate 153. This end around shifting of the memory 71 is illustrated in FIG. 4 by an arrow 235.

While the memory 71 is being cycled, its output can be introduced to an AND gate 201 with the signal T2. This signal from the AND gate 201 can be used to reset the flip flop 97 and also to set the flip flop 101. In this condition, the flip flop 101 will provide a "memory has data" signal on a conductor 203 which activates a pulse former 205 to set the flip flop 103. The setting of flip flop 103 will provide a "LBA search" signal on a conductor 207. This signal can be introduced simultaneously with the memory output into an AND gate 209 so that each bit of black data at the memory output will activate a pulse former 211. The resulting pulse, after being detained in a delay 213, can be introduced to the "load parallel" terminal 81 of the register R3 so that the address of each bit of black data is loaded into register R3 from the counter C1.

In a similar manner, the LBA search signal and the "memory output" signal can be introduced to an AND gate 215 so that each bit of black data resets the white space counter C3. When the signal C3 = 22 appears on the conductor 76 signifying that a significant run of white data has appeared at the memory output, the signal C3 = 22 is introduced through the OR gate 129 to reset the flip flop 103. This terminates the LBA search signal so that the last address appearing in the register R3 is LBA1.

Although LBA1 has been found and stored, it may be desirable to continue cycling the memory 71 so search for FBA2, if there is one. To perform this function, the signal C3 = 22 can also be used to set the flip flop 105. This will provide a "FBA-N search" signal on an output conductor 219. This signal together with the memory output signal can provide inputs to an AND gate 221 so that the next bit of dark data appearing at the output of the memory 71 will set the flip flop 99. The resulting signal "FBA-N(found)" can FBN-N(found)"introduced through the OR gate 159 so that a pulse is provided by the pulse former 160. In a manner previously described, this pulse will appear at the load parallel terminal 81 of the register R1 so that the contents of the counter C1 are loaded in parallel to the register R1. In this manner FBA2, if any, can be loaded into register R1. The cycling of the memory 71 may be permitted to continue until the signal C1 = 1,200 apears on the line 185 to reset the flip flop 95.

Referring to the upper portion of the programmer 75, it will be noted that the output of the AND gate 195 which terminates the time period T2 can also be used to set the flip flop 87 to initiate the time period T3. During the time period T3, it may be desirable to send LBA1 from register R3 and simultaneously reload that address into the same register. It may also be desirable to transfer the contents of register R2 (FBA1) to the counter C1.

The sending of LBA1 can be carried out in the following manner. The signal T3 can be introduced to an AND gate 223 to enable clock pulses, preferably at the slow rate, to be introduced through an OR gate 225 to clock LBA1 from the register R3. This address may be enabled through an AND gate 227 by the signal T3 and introduced to a conductor 229. From the conductor 229, LBA1 can be reloaded through an OR gate 231 into the register R3. The conductor 229 is also connected to the OR gate 139 so that LBA1 is directed into the modem 73 for transmission on the telephone line 29. The transmitting of LBA1 is illustrated in FIG. 4 by an arrow 232.

During the time period T3, it may also be desirable to shift the memory 71, preferably at the fast clock rate, until data corresponding to the FBA1 appears at the memory output. This will place the data beginning with FBA1 at the output of the memory 71 to facilitate the immediate transmission of the data during the next time period. The signal from the AND gate 195 which initiated the time period T3 can also be used to set the flip flop 91. This condition provides a "load white" signal on a conductor 241. The load white signal enables an AND gate 243 which permits clock pulses, preferably at the fast rate, to pass through the OR gate 147 and thereby clock the memory 71. The flip flop 91 can be reset by any black data bits in the memory output signal which can be introduced through an OR gate 245 to an AND gate 247. The AND gate 247 can be enabled by the signal T3 to reset the flip flop 91 and terminate the clocking of the memory 71. The shifting of the memory 71 to FBA1 is illustrated by the arrow 253 in FIG. 4.

It will be noted that the clock pulses passing through the OR gate 147 can be inhibited at the AND gate 149 so that the memory address counter C1 is not simultaneously clocked with the memory 71. However, with the cycling of the memory 71 terminated and FBA1 at the memory output, it is particularly desirable that the memory address counter C1 also contain FBA1. One way to insure this state is to unconditionally load the contents of R2 (FBA1) into C1. This can be accomplished by enabling an AND gate 246 with the signal T3 so that the load white signal on conductor 241 can be passed to activate a pulse former 248. The resulting pulse can be introduced to the load parallel terminal of the counter C1 so that the contents of register R2 (FBA1) are loaded into the counter C1.

This pulse from the pulse former 248 can be detained in a delay 249 and then introduced through the OR gate 164 to the AND gate 166. The signal T3 will pass through the OR gate 168 to enable the AND gate 166 so that the pulse is introduced to the load parallel terminal 81 of the register R2. This will transfer the contents of register R1 (FBA2, if any) to the register R2 for immediate transmission after the data between FBA1 and LBA1.

Thus, at the end of time period T3, it will be noted that the data bit corresponding to FBA1 is located at the output of the memory 71; the address FBA1 is contained in the counter C1; and the registers R2 and R3 contain FBA2 (if any) and LBA1, respectively.

In this particular embodiment, it is desirable that the time period T3 be terminated after 11 slow clock pulses so that the contents of register R3 are shifted a corresponding number of times during the transmission of LBA1. It will be noted that the program counter C2 which had counted 11 at the end of time period T2 was not reset at that time. Therefore, the signal C2 = 22 on line 86 can be the signal used to terminate the time period T3. This signal and the signal T3 can be introduced to an AND gate 237 to clear the flip flop 87. The signals T3 and C2 = 22 can also be introduced to an AND gate 239 to reset the program counter C2 at the end of time period T3.

The condition for terminating the time period T3 can also be used to set the flip flop 89 and thereby initiate the time period T4. During the time period T4, it will be a primary function of the transmitter 25 to send the dense data which is located in the memory 71 between the addresses FBA1 and LBA1.

The signal T4 can be used to enable an AND gate 261 so that the contents of the memory 71 are clocked through the OR gate 139 into the modem 73 for transmission. However, it is preferable that the memory 71 be clocked only until LBA1 appears at the memory output. To accomplish this function, the transmitter 25 can be provided with a fast serial comparator 251 which is illustrated in FIG. 3 below the programmer 75. The fast serial comparator 251 receives inputs from the registers R1 and R3 and compares these addresses until they are equal as evidenced by a signal FBA = LBA on a conductor 255. This comparison is initiated by a "start compare" signal which is the same signal which begins the time period T4. During the comparison operation, a "compare" signal appears on the conductor 256. This compare signal can be used to clock the counter C2 and the register R3 through the AND gates 258 and 260 respectively. The compare signal also permits the reloading of the register R3 through an AND gate 262. Since the signal C2 = 22 and the compare signal initially occur simultaneously, they can be combined in an AND gate 264 to reset the program counter C2.

During the time period T4, clock pulses, preferably at the slow clock rate, are enabled to pass through an AND gate 257 and the OR gate 147 to clock the memory address counter C1 and the memory 71. It will also be noted that the signal T4 enables an AND gate 259 so that clock pulses, preferably at the slow clock rate, are simultaneously introduced through the OR gate 161 to the load parallel terminal 81 of the register R1. This permits the contents of the memory address counter C1 to be loaded in parallel into the register R1. It will be noted that the address in the counter C1 which was initially FBA1 is being increased with each slow clock pulse so that the address in the counter C1 approaches LBA1. This same progression of addresses is occurring in register R1 as a result of the transfer from the counter C1 previously described.

The clocking of the memory 71 and the counter C1 continues until the dynamic address in register R1 compares to the static address (LBA1) in register R3. At this point, the signal FBA = LBA on the line 255 will clear the flip flop 89. This will terminate the signal T4 to inhibit the clocking of the memory 71 and the counter C1. This transmission of the data between FBA1 and LBA1 is illustrated in FIG. 4 by an arrow 265.

If additional data is found in the same scan line, the flip flop 99 will have been set in a manner previously described and the signal FBA-N(found) will still be active. This signal FBA-N can be introduced through the OR gate 175 to provide an input to the AND gate 173. Similarly, the signal FBA = LBA from the comparator 251 can be introduced through the OR gate 171 to provide another input to the AND gate 173. Since these signals will both occur at the AND gate if FBA2 has been found, the signal from the AND gate 173 will set the flip flop 85 to initiate the time period T2. It will be noted that FBA2, if any, was transferred into register R2 at an earlier point in time so that the transmitter 25 is in condition to immediately transmit FBA2 during the iterate time period T2. In the manner previously described, FBA2 will be transmitted and the memory 71 will be searched for LBA2 and FBA-N, if any. Then LBA2 will be transmitted and the memory 71 will be shifted to FBA2. Finally, the data between FBA2 and LBA2 will be transmitted. These functions are illustrated in FIG. 4 by the arrows designated by the numerals 266 through 270.

From this point, the system will continue to iterate until no additional FBA-N has been found. This condition can be used as an input to an AND gate 263 together with the signal FBA = LBA on the line 255. The signal from the AND gate 263 can be introduced through the OR gate 117 to set the flip flop 83 and thereby initiate the time period T1. Since the picture 11 was stepped in the previous time period T1, the transmitter 25 is now in condition to scan and transmit line 19 of the picture 11. The operations associated with the scanning of line 19 are illustrated by the arrows collectively and generally designated by the reference numeral 272 in FIG. 4.

Figure 5:
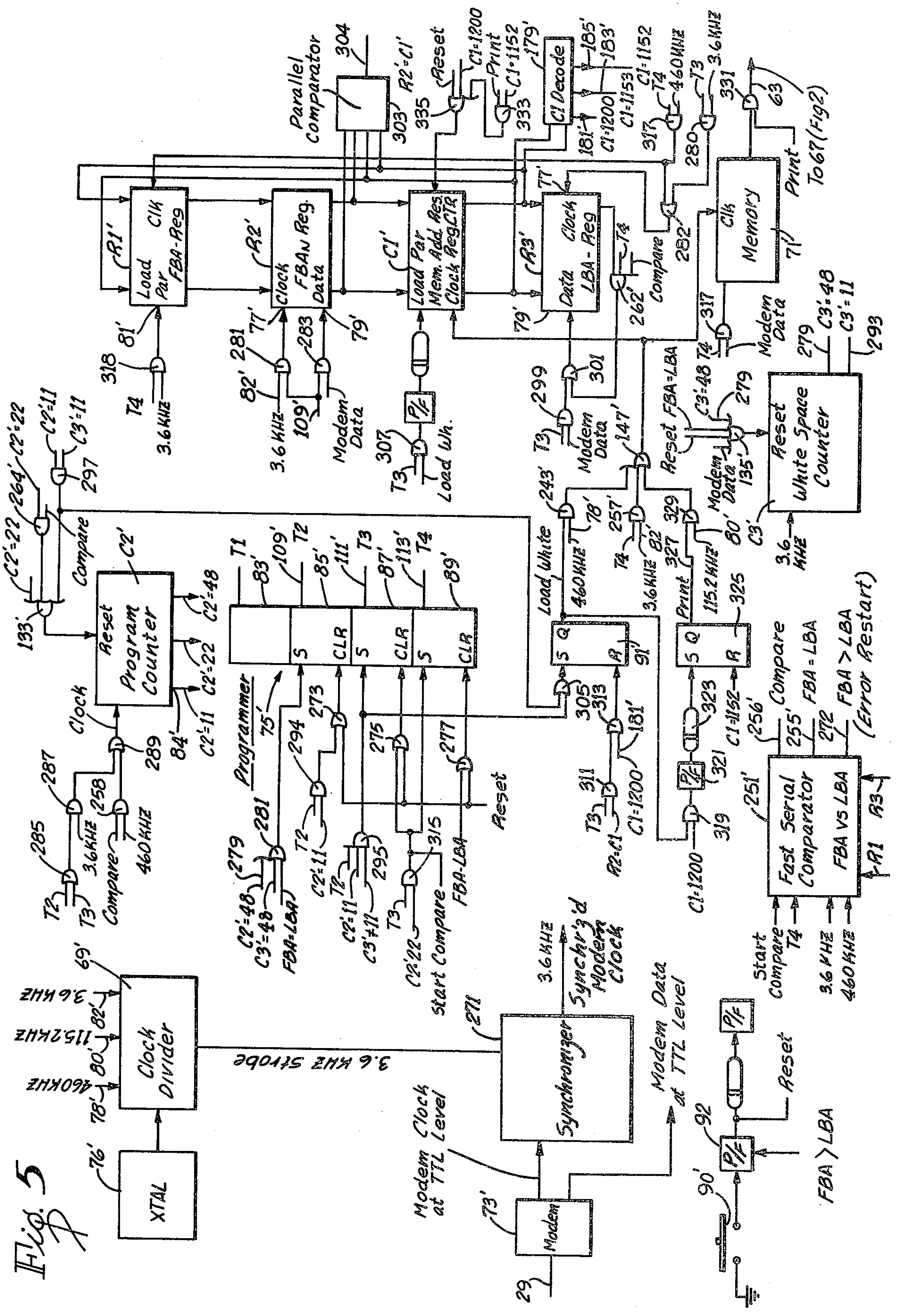
FIG. 5 is a block diagram of the receiver illustrated in FIG. 2

The signals transmitted by the transmitter 25 can be manipulated in the receiver 25' to reproduce the picture 11. Referring to FIG. 5, it will be noted that the receiver 25' uses many of the components previously described with reference to the transmitter 25 and, as previously noted, these similar components will be designated with the same reference numeral followed by a prime.

With reference to FIG. 4, you will recall that the information on the telephone line 29 appears in the following sequence. Prior to the transmission of any information, the transmitter 25 sends a constant stream of digital 1's. When the first line 17 of the picture 11 is scanned, a burst signal of 48 zeros can be transmitted to alert the receiver 25' that addresses and data may immediately follow. Then the following information is typically transmitted in sequence. FBA1, LBA1, data, FBA2, LBA2, data . . . FBA-N, LBA-N, and data. This sequence is iterated for each of the lines scanned.

The information received by the modem 73' is separated into data information and clock information. The modem clock at the TTL level is synchronized with the clock divider 69' in a synchronizer 271 to provide a synchronized modem clock.

The operation of the receiver 25' begins in a manner similar to that of the transmitter 25 with the pressing of the pushbutton 90'. This activates a pulse former 92 which in turn provides a reset signal. With the pressing of the pushbutton 90', the reset signal clears the flip flops 85', 87' and 89' through the OR gates 273, 275 and 277, respectively. The reset signal can also be used to clear the counters C1' and C3'. The receiver 25' remains in this stand-by condition while it receives the stream of digital 1's which signifies that no information is being transmitted.

When the burst signal appears on the telephone line 29, the first function of the receiver 25' can be to recognize the burst signal and prepare to receive FBA1, LBA1, and data which immediately follow. The receipt of the burst signal is illustrated in FIG. 4 by the arrow 276.

The recognition of the burst signal can be accomplished by the white space counter C3' which provides a signal "C3' = 48" on an output conductor 279. This signal is introduced through an OR gate 281 to set the flip flop 85' and initiate the time signal T2 on the line 109'. The signal T2 enables AND gates 281 and 283 which load the modem data immediately following the burst signal into the register R2'. This preferably is carried out at the slow clock rate.

The signal T2 can be introduced through an OR gate 285 to enable an AND gate 287. The signal from the AND gate 287 can be introduced through an OR gate 289 to clock the program counter C2'. The signal C2' = 11 on the line 84' can provide an input, together with the signal T2, to an AND gate 294. The resulting signal can be introduced through the OR gate 273 to clear the flip flop 85' and terminate the time period T2. In this manner, the first 11 bits following the burst signal can be loaded into the register R2'. It should be noted that if the particular line scanned contained dense data, this 11 bits of information will contain some digital 1's expressing the address FBA1. However, if the line scanned contained no dense data, the first 11 bits following the burst signal will contain only 0's and the receiver 25' will not be interested in processing the information further until another burst signal is received.

The 11 bits following the burst signal can be analyzed for digital 1's by the white space counter C3'. First the counter C3' can be made responsive C3' the signal C3'= 48 to reset the counter C3' through the OR gate 135' at the termination of the burst signal. Then the next 11 bits of information can be clocked into R2 as previously described. The signal C2' = 11 can be used to clear the flip flop 85' and hence the signal T2 through the AND gate 294. If no digital zeros have reset the counter C3', the inhibiting of the signal T2 will leave the receiver 25' in no step in which case it will stand by to receive the next burst signal. However, if C3' has not counted to 11 when C2' = 11, then these 11 bits will be recognized in FBA1 and the operation of the receiver 25' will continue. This receipt of FBA1 is illustrated in FIG. 4 by the arrows 278.

The operation of the receiver 25' continues with an initiation of the time period T3. A signal C3' ≠ 11 can be introduced with the signals C2' = 11 and the signal T2 to an AND gate 295. This signal from the AND gate 295 can be introduced to the flip flop 87' to initiate the signal T3 on line 111'. Note that if the signal C2' = 11 and C3' = 11 appear simultaneously at an AND gate 297, the signal will be introduced through the OR gate 133' to reset the counter C2'.

During the time period T3, the receiver 25' may perform the primary functions of loading LBA1 into the register R3', and preparing the memory 71' to receive the data. To accomplish the first objective, the signal T3 can enable an AND gate 299 so that the modem data passes through an OR gate 301 into the register R3'. This is preferably accomplished at the slow clock rate as will be noted with reference to the AND gate 280 and the OR gate 282. The loading of R3' with LBA1 is illustrated in FIG. 4 by the arrow 300.

To insure that the data following LBA1 is loaded into the memory 71' at a position corresponding to the position of the data in the picture 11, the memory 71' can be initially clocked until FBA1 appears at its input. This can be accomplished by clocking white data into the memory 71′ up to the address FBA1. The load white signal can be generated by the flip flop 91′ in response to the signal from the AND gate 295 which passes through an OR gate 305. The load white signal enables the AND gate 243′ so that fast clock pulses can be passed through the OR gate 147′ to clock the counter C1′ and the memory 71′. This loading of digital 0's to FBA-N is illustrated by the arrow 328 in FIG. 4.

The outputs from the register R2′ and the counter C1′ can be introduced to a parallel comparator 303 which provides a signal R2′ = C1′ on a conductor 304 when this condition occurs. This signal can be used in combination with the signal T3 to enable an AND gate 311 which, through an OR gate 313, resets the flip flop 91′. This will inhibit the load white signal so that the clocking is stopped with address FBA1 at the input of the memory 71′.

Since the counter C2′ was not reset at the end of the time period T2 if there was data on the scan line, the signal C2′ = 22 can be introduced with the signal T3 to an AND gate 315 so clear the flip flop 87′ and set the flip flop 89′. This will terminate the signal T3 and initiate the signal T4 on the line 113′.

To insure the memory address counter C1′ contains FBA1, it may be advantageous to combine the signal T3 with a hot load white signal in an AND gate 307. The resulting signal can enable a pulse which is preferably delayed before being introduced to the load parallel terminal of the counter C1′. This will provide for the parallel transfer of the contents of the register R2′ (FBA1) into the counter C1′.

During the time period T4, an AND gate 317 can be enabled to permit the modem data to be clocked into the memory 71′ as shown by the arrow 316 in FIG. 4. The clocking of the memory address counter C1′ and the memory 71′ is preferably accomplished at the slow clock rate as will be noted with reference to the AND gate 257′ and the OR gate 147′.

To insure that only the data between FBA1 and LBA1 is clocked into the memory 71′, the contents of the registers R1′ and R3′ can be compared in the fast serial comparator 251′. While the contents of the register R3′ (LBA1) remains static, the contents of the register R1′ can be made to approach LBA1. This is typically accomplished by clocking the load parallel terminal of the register R1′ through an AND gate 318 so that the counter C1′ is clocked, the contents of the register R1′ approach LBA1. During this comparison, a compare signal will appear on the conductor 256′. This signal can be used to reset the program counter C2′ through the AND gate 264′, and to enable the AND gate 258′ for clocking the counter C2′ during the comparison. The AND gate 262′ can also be enabled by the compare signal to reload the register R3 through the OR gate 301. This reloading is desirable so that LBA1 remains in register R3 for the following comparison with the next address appearing in the register R1. Note that when the contents of register R1′ and register R3′ compare, an appropriate signal. FBA = LBA, will appear on the line 255′. This signal can be introduced through the OR gate 277 to clear the flip flop 89′ and inhibit the signal T4.

A particularly desirable feature of the present invention is an ascension check which can be performed by the fast serial comparator 251′. Since an LBA by definition follows the associated FBA in a particular scan line, the address expressed by the LBA should be higher in number than the associated FBA. If, in the comparison of these quantities by the comparator 251′, it appears that FBA is greater than LBA, an appropriate signal can be provided on a conductor 272. It may be best to deal with this type of error by not printing the associated scan line at all. Thus, the signal FBA > LBA can be introduced to the pulse former 92 (next to the pushbutton 90′) to reset the receiver 25′. This ascension check can result in a white space appearing across all or part of the scan line, but as far as the reproduced picture is concerned, this is preferred to having the data scrambled throughout the associated line.

If the addresses FBA and LBA ascend and the signal FBA = LBA is provided by the comparator 251′, this signal can be introduced through the OR gate 281 to set the flip flop 85′. Thus, the receiver 25′ iterates unconditionally to the time T2 and prepares to receive FBA2, if any, LBA2, and the data corresponding to those addresses. The arrows 320, 322, 324 and 332 in FIG. 4 illustrate the preferred timing of these operations. The iterate cycle will occur for each of the dense data areas in the particular scan line until the next 11 bits of information is void of black data. This will be recognized as a burst signal rather than an address FBA-N and the receiver 25′ will know that a new line is being scanned. Thus, the arrows shown collectively and generally at 326 in FIG. 4 and designated by the time periods T1, T2, T3 and T4 correspond to the scanning of the second scan line 19 (FIG. 1).

When there is no additional data in the line scanned, the next 11 bits in the modem data will contain only 0's and the time period T3 will be inhibited. Additionally, the signals C2′ = 11 and C3′ = 11 will both occur. These two signals which are introduced to the AND gate 295, as previously noted, can be used to set the flip flop 91′ through the OR gate 305. This will provide the load white signal which will enable the memory address counter C1′ and the memory 71′ at the fast clock rate. Thus, with data loaded to the last black address of the last area, the remaining portions of the memory 71′ can be loaded with white data. When the memory address counter C1′ reaches 1,200, the signal C1′ = 1,200′ on the line 181′ can be gated through the OR gate 313 to reset the flip flop 91′. The loading of digital 0's to the remainder of the memory 71 is illustrated in FIG. 4 by the arrow 330.

The load white signal and the C1 = 1,200 signal can be introduced through an AND gate 319 to activate a pulse former 321. The resulting pulse can be detained in a delay 323 before it sets a flip flop 325. In this condition, a "print" signal will be provided on the conductor 327 for enabling an AND gate 329. This will permit clock pulses, preferably at the medium clock rate, to pass through the OR gate 147′ to clock the memory 71′ and the counter C1′. The print signal can also be used to enable an AND gate 331 so that the contents of the memory 71′ are introduced on the print data line 63 (FIG. 2). As previously explained, this signal modulates the cathode ray tube 66 in the printing apparatus 31. The printing of the first line 17 of data from the memory 71 can be accomplished in the time interval illustrated by the arrow 332 in FIG. 4. The film 72 (FIG. 2) can be appropriately indexed by a signal on the conductor 74 as shown by the arrow 334 in FIG. 4.

The signal C1′ = 1,152 can be used to reset the flip flop 325 to terminate the print signal. It will be recalled that the address 1,152 corresponds to the last address in the scan line of a preferred embodiment of the invention. Thus, even though the memory has 1,200 addresses, the reproduced picture need only be provided with the information up to the 1,152nd address. When the print signal and the C1' = 1,152 signal appear at the input to an AND gate 333, the counter C1' can be reset through the OR gate 335.

Many of the advantages of the present invention have been discussed throughout the detailed description of the preferred embodiments thereof. However, some of these advantages are worthy of further discussion. Of particular interest is the presence of the memory 71 in the transceivers 25. With the use of a memory, the information present as a result of scanning of the picture 11 can be retained in the system and manipulated to accomplish various functions.

One such function which the memory facilitates is the transmission of only dense data and the limiting addresses associated therewith. This permits the skipping of significant white spaces and substantially reduces the time of transmission. The memory in the receiver enables these skipped white spaces to be reconstructed by merely loading white data between the dense data areas.

This highly desirable white space skipping feature is not accompanied by an impractical beam hopping apparatus. Rather, the memory and associated data retrieval apparatus permit the scanning of a line at a constant rate of speed and in only one direction. As a result, the present invention can be implemented with less expensive hardware which makes it highly practical for general use.

The memory also permits the retention of the information in a particular scan line so that if the following line scanned contains the same information, the retained data can be reprinted. The burst signal, instead of containing 48 zeros, might be appropriately encoded to notify the receiver of the similarlity of the following scan line. Even minor differences in the information content of scan lines can be handled in this manner. Thus, an appropriate encoding of the burst signal can inform the receiver of minor changes that can be made to the retained data before the next line is printed from the memory.

The fast serial comparison of the FBA and LBA also provides an ascension check which can be used to detect errors in the positional information. If the FBA is greater than the LBA, an appropriate signal can be provided to inhibit the printing of the associated dense area of data or the entire scan line.

Although a particular embodiment of the invention has been discussed and illustrated with reference to specific clock rates, a specific number of addresses in a scan line, and a specific address word length, it will be apparent that these and other specific features of the embodiment described are merely examples of a broad inventive concept. From this description, other embodiments within the scope of the invention will become apparent to those of ordinary skill in the art. For this reason, the scope of the invention should be ascertained only with reference to the following claims.

I claim:

1. A method for substantially reproducing a picture including generally dark areas separated by generally light areas, and each of the areas defined by a beginning address and an ending address, including the steps of:

scanning the picture at a substantially constant rate of speed to provide digital data corresponding to at least a portion of the generally light areas and generally dark areas of the picture;

storing the provided data in a first memory;

ascertaining the beginning address and the ending address of at least a particular group of the data stored in the first memory and corresponding to one of the generally light areas and generally dark areas of the picture;

transmitting address information corresponding to the beginning address and the ending address of the particular group of data determined in the ascertaining step; and transmitting from the first memory the digital data defined by the address information transmitted.

2. The method set forth in claim 1 wherein the ascertaining step includes the step of searching the first memory to ascertain the beginning address and the ending address of the particular group of the data corresponding to the generally dark areas and generally light areas of the picture.

3. The method recited in claim 1 further comprising the steps of:

receiving the beginning address, the ending address, and the digital data associated with the particular area;

loading the data associated with the particular area into a second memory at a location in the second memory corresponding to the beginning address and ending address of the particular area; and printing at least a portion of the picture in accordance with the data in the second memory.

4. The method set forth in claim 1 wherein the scanned area of the picture includes generally dark areas separated by generally light areas having a minimum length and wherein the particular group of the data corresponds to a generally dark area of the picture, the method further comprising after the scanning step, the step of expressing the beginning address and ending address of the particular group in digital words having a particular length equal to one-half the minimum length of the generally tight areas of the picture.

5. A facsimile system including:

scanning means for viewing at least one line of a picture and providing a first digital data stream distinguishing areas of substantially dark data from areas of substantially light area;

memory means for receiving the digital data from the scanning means and for storing the digital data at addresses in the memory means corresponding to the positions of the associated areas in the picture;

first means for recycling the memory means and responsive to dense areas of data corresponding to the substantially dark areas of the picture to determine the first and last addresses of a particular one of the dense areas of the date;

second means for storing an address and operable to indicate the address at the output of the first memory means;

third means for storing the last address of the particular area;

fourth means communicating with the second means, the third means, and the memory means to transmit the first address and the last address of the particular area and the data within the particular area;

fifth means connected to the second means and the third means and having characteristics for comparing the address at the output of the memory means with the last address of the particular area, the fifth means providing a first signal enabling the data to be clocked from the memory when the compared addresses have a particular relationship, and providing a second signal inhibiting the clocking of the data from the first memory means when the last address of the particular area is not greater than the first address of the particular area;

receiving means for receiving the transmitted data from the communication channel and for constructing a second digital data stream similar to the first digital data stream; and reproducing means responsive to the second digital data stream to reproduce at least one line of the picture.

6. A method for transmitting information in a picture, the picture defined by a plurality of lines, each divided into a plurality of addresses, and the information at each of the addresses being generally of a first type of information or a second type of information, the method including the steps of:

a. scanning one of the lines of the picture to determine whether the information at each of the addresses in the second line is generally of the first type of information or the second type of information;

b. providing a digital signal including a data bit associated with each of the addresses in the scanned line of the picture, the data bits in the digital signal having first characteristics if the associated address includes the first type of information and having second characteristics if the associated address includes the second type of information, the digital signal including at least one particular group of data bits having generally one of the first characteristics and the second characteristics;

c. providing a memory having a plurality of addresses at least equal in number to the number of addresses in the scanned line of the picture;

d. storing the data bits of the digital signal in the addresses of the memory;

e. ascertaining the address defining the beginning of one of the particular groups of data bits in the digital signal;

f. ascertaining the address defining the ending of the particular group of data bits having the beginning address ascertained in step (e);

g. transmitting the address as ascertained in steps (e) and (f); and thereafter h. transmitting the data bits defined by the beginning address and the ending address transmitted during step (g).

7. The method recited in claim 6 further comprising the steps of:

i. detecting in the digital signal stored in the memory the pressure of an additional group of data bits having generally one of the first characteristics and second characteristics;

j. iterating steps (c) through (f) for each of the additional groups of data bits detected in step (i); and k. iterating steps (a) through (j) for another line in the picture when no additional groups of data bits are detected during step (i).

8. A facsimile system providing for transmission in a communication channel of a signal having digital characteristics dependent upon the light and dark characteristics of a picture, including:

scanning means moving in a single direction and at a constant rate of speed for scanning a line of the picture to provide a digital signal including a plurality of data bits forming at least one dense data area defined by a first data bit and a last data bit, the dense data area corresponding to a generally dark area in the scanned line of the picture;

memory means communicating with the scanning means, the memory means having a plurality of addresses and characteristics for storing each of the data bits of the digital signal in a different one of the addresses;

first means communicating with the memory means for determining the particular address associated with the first data bit of the dense data area and for positioning the particular address at the output of the memory;

second means communicating with the memory means for determining the address of the last data bit of the dense data area; and third means communicating with the memory means and the second means for clocking the data bits from the memory means until the address at the output of the memory means corresponds to the address of the last data bit determined by the second means; and fourth means responsive to the data bits clocked from the memory for introducing the data bits into the communication channel.

9. The facsimile system recited in claim 8 further comprising:

a first register included in the second means and having properties for storing a digital value corresponding to the last data bit of the dense data area;

a second register included in the third means and communicating with the memory means, the second register having properties for storing a digital value corresponding to the address at the output of the memory means so that the digital value stored in the second register increases in value when the data is being closed from the memory by the third means; and a comparator included in the third means and communicating with the first register and the second register for comparing the digital value stored in the second register with the digital value stored in the first register and for inhibiting the clocking of the data bits from the memory means when the digital value stored in the second register is equal to the digital value stored in the first register.

10. The facsimile transmitter recited in claim 9 wherein the fourth means includes a transmitter communicating with the memory means, the first register in the second means, and the second register in the third means, the transmitter having properties for transmitting the digital value stored in the first memory and corresponding to the address of the first data bit in the dense data area, the digital value stored in the second register and corresponding to the address of the last data bit in the dense data area, and for subsequently transmitting the data being clocked from the memory means and corresponding to the data in the dense data area.

11. A method for reproducing a line of a picture, the line being divided into a multiplicity of discrete areas each having an address corresponding to its location along the line, and a plurality of the discrete areas forming a generally dark area of the picture between a first address and a second address, the method including the steps of:

scanning the line of the picture to provide a digital signal including a multiplicity of data bits each having digital characteristics corresponding to the light and dark characteristics of an associated one of the discrete areas of the line, a plurality of the data bits forming in the digital signal a dense data area corresponding to the generally dark area in the line of the picture;

providing a first memory having a plurality of addresses each corresponding in location to the address of an associated discrete area in the line of the picture;

storing the digital signal in the memory with each of the data bits located at one of the addresses in the memory corresponding to the address of the associated discrete area in the line of the picture;

searching the memory to determine the first address associated with the dense data area of the digital signal;

transmitting the first address determined in the first searching step;

searching the memory during the first transmitting step to determine the second address associated with the dense data area of the digital signal;

transmitting the second address determined in the second searching step;

shifting the memory during the second transmitting step to place the first address associated with the dense data area at the output of the memory;

clocking from the memory the dense data defined by the first addresss and the second address associated with the dense data area in the digital signal; and transmitting the data clocked from the memory.

12. The method recited in claim 11 wherein a discrete area in the picture having generally dark characteristics is associated with a data bit in the digital signal having a first digital characteristic and a discrete area in the picture having generally light characteristics is associated with a data bit having a second digital characteristic and the method further comprises the steps of:

receiving the first address associated with the dense data area in the digital signal;

receiving the second address associated with the dense data area in the digital signal;

providing a second memory having a plurality of addresses corresponding in location to the address of an associated discrete area in the line of the picture;

loading data bits having the second digital characteristics into the memory during the second receiving step at the addresses preceding the first address associated with the dense data area of the digital signal;

receiving the data transmitted during the transmitting step;

loading the data into the memory at the addresses defined by the first address and the second address associated with the dense data area of the digital signal;

printing a line of the picture with light and dark area corresponding to the digital characteristics of the data bits in the second memory; whereby the scanned line of the picture is reproduced as the printed line of the picture with a generally dark area located in the printed line in a position corresponding to the location of the generally dark area in the scanned line of the picture.

13. The method recited in claim 11 wherein the first searching step includes the steps of:

providing a first register;

serially shifting the memory to determine the first addresss associated with the dense data area of the digital signal; and storing the first address in the first register.

14. The method recited in claim 13 wherein the second searching step includes the steps of:

providing a second register;

serially shifting the memory to determine the second address associated with the dense data area of the digital signal; and storing the second address in the second register.

15. The method recited in claim 14 wherein the clocking step includes the steps of:

comparing the address at the output of the memory with the address in the second register; and serially shifting the memory until the address at the output of the memory has a particular relationship with the address stored in the second register.

16. A facsimile apparatus for scanning a picture at a first location and reproducing the picture at a second location communicating with the first location through a communication channel, comprising:

scanning means for scanning a plurality of lines of the picture and for providing a digital signal for each of the lines of the picture, the digital signal being defined by digital data having characteristics dependent upon the visual characteristics of a particular one of the lines of the picture;

transmitting means responsive to the digital signal from the scanning means for transmitting through the communication channel at least a portion of the digital data in the digital signal;

first memory means included in the transmitting means for storing the digital data associated with the particular line of the picture at a location in the first memory means corresponding to the location of the associated visual characteristics in the particular line of the picture;

receiving means disposed at the second location and communicating with the transmitting means through the communication channel for receiving the digital data transmitted by the transmitting means;

second memory means included in the receiving means and being responsive to the digital data transmitted by the transmitting means for storing the digital data at a location in the second memory means corresponding to the location of the associated visual characteristics in the particular line of the picture;

reproducing means communicating with the receiving means at the second location and being responsive to the digital data stored in the second memory means to reproduce the associated line of the picture;

first means included in the transmitting means for cycling the first memory means, the first means having characteristics for distinguishing among the digital data in the first memory means areas of primarily a first type of digital data corresponding to generally dark areas of the picture and areas of primarily a second type of digital data corresponding to generally light areas of the picture;

second means included in the transmitting means for providing digital information expressing the limits of a particular one of the areas of primarily the first type of digital data; and third means included in the transmitting means for transmitting the digital information corresponding to the limits of the particular area and for transmitting the digital data in the particular area.

17. A facsimile apparatus for scanning a picture at a first location and reproducing the picture at a second location communicating with the first location through a communication channel, comprising:

scanning means for scanning a plurality of lines of the picture and for providing a digital signal for each of the lines of the picture, the digital signal being defined by digital data having characteristics dependent upon the visual characteristics of a particular one of the lines of the picture;

transmitting means responsive to the digital signal from the scanning means for transmitting through the communication channel at least a portion of the digital data in the digital signal;

first memory means included in the transmitting means for storing the digital data associated with the particular line of the picture at a location in the first memory means corresponding to the location of the associated visual characteristics in the particular line of the picture;

receiving means disposed at the second location and communicating with the transmitting means through the communication channel for receiving the digital data transmitted by the transmitting means;

second memory means included in the receiving means and being responsive to the digital data transmitted by the transmitting means for storing the digital data at a location in the second memory means corresponding to the location of the associated visual characteristics in the particular line of the picture;

reproducing means communicating with the receiving means at the second location and being responsive to the digital data stored in the second memory means to reproduce the associated line of the picture;

first means included in the transmitting means for cycling the first memory means, the first means having characteristics for distinguishing among the digital data in the first memory means areas of primarily a first type of digital data corresponding to generally dark areas of the picture and areas of primarily a second type of digital data corresponding to generally light areas of the picture;

second means included in the transmitting means for providing digital information expressing the limits of a particular one of the areas of primarily the first type of digital data;

third means included in the transmitting means for transmitting the digital information corresponding to the limits of the particular area and for transmitting the digital data in the particular area;

fourth means included in the receiving means for receiving digital information expressing the limits of the particular area and for cycling the second memory means in the receiving means to an address corresponding to one of the limits of the particular area;

fifth means included in the receiving means for clocking the digital data of the particular area into the second memory means of the receiving means; whereby the digital data of the particular area is disposed in the second memory means at addresses dependent upon the position of the particular area in the digital signal and the position of the associated generally dark area in the picture.

18. A facsimile apparatus for scanning a picture at a first location and reproducing the picture at a second location communicating with the first location through a communication channel, comprising:

scanning means for scanning a plurality of lines of the picture and for providing a digital signal for each of the lines of the picture, the digital signal being defined by digital data having characteristics dependent upon the visual characteristics of a particular one of the lines of the picture;

transmitting means responsive to the digital signal from the scanning means for transmitting through the communication channel at least a portion of the digital data in the digital signal;

first memory means included in the transmitting means for storing the digital data associated with the particular line of the picture at a location in the first memory means corresponding to the location of the associated visual characteristics in the particular line of the picture;

receiving means disposed at the second location and communicating with the transmitting means through the communication channel for receiving the digital data transmitted by the transmitting means;

second memory means included in the receiving means and being responsive to the digital data transmitted by the transmitting means for storing the digital data at a location in the second memory means corresponding to the location of the associated visual characteristics in the particular line of the picture;

reproducing means communicating with the receiving means at the second location and being responsive to the digital data stored in the second memory means to reproduce the associated line of the picture;

first means included in the transmitting means for cycling the first memory means, the first means having characteristics for distinguishing among the digital data in the first memory means areas of a primarily first type of digital data corresponding to generally dark areas of the picture and areas of primarily a second type of digital data corresponding to generally light areas of the picture; and second means included in the transmitting means for transmitting the data associated with a particular one of the areas of the first type of data.

19. A facsimile apparatus for scanning a picture at a first location and reproducing the picture at a second location communicating with the first location through a communication channel, comprising:

scanning means for scanning a plurality of lines of the picture and for providing a digital signal for each of the lines of the picture, the digital signal being defined by digital data having characteristics dependent upon the visual characteristics of a particular one of the lines of the picture;

transmitting means responsive to the digital signal from the scanning means for transmitting through the communication channel at least a portion of the digital data in the digital signal;

first memory means included in the transmitting means for storing the digital data associated with the particular line of the picture at a location in the first memory means corresponding to the location of the associated visual characteristics in the particular line of the picture;

receiving means disposed at the second location and communicating with the transmitting means through the communication channel for receiving the digital data transmitted by the transmitting means;

second memory means included in the receiving means and being responsive to the digital data transmitted by the transmitting means for storing the digital data at a location in the second memory means corresponding to the location of the associated visual characteristics in the particular line of the picture;

reproducing means communicating with the receiving means at the second location and being responsive to the digital data stored in the second memory means to reproduce the associated line of the picture;

first means included in the transmitting means for cycling the first memory means, the first means having characteristics for distinguishing among the digital data in the first memory means areas of a primarily first type of digital data corresponding to generally dark areas of the picture and areas of primarily a second type of digital data corresponding to generally light areas of the picture;

second means included in the transmitting means for transmitting the data associated with a particular one of the areas of the first type of data;

third means included in the receiving means for clocking the data of the particular area into the second memory means for the receiving means at addresses corresponding to the position of the particular area in the digital signal and the position of the corresponding generally dark area in the picture;

fourth means included in the receiving means for providing digital data of the second type of digital data corresponding to the generally light areas in the picture; and fifth means included in the receiving means for clocking the data provided by the fourth means into the second memory means of the receiving means at locations in the second memory means defined by at least one of the areas of the first type of digital data.

20. The facsimile apparatus recited in claim 19 wherein the reproducing means is responsive to the first and second types of data in the second memory means of the receiving means print at least one line of the picture.

21. A facsimile system responsive to a picture at a first end of a communication channel to reproduce a picture at a second end of a communication channel, the facsimile system including:

scanning means for viewing a line of the picture and for providing a first digital data stream having a first type of data corresponding to generally dark areas of the scanned line and having a second type of data corresponding to generally light areas of the scanned line;

a transceiver disposed at the first end of the communication channel and operable in a transmit mode of operation between the scanning means and communication channel;

first memory means included in the transceiver for receiving the first digital data stream from the scanning means and for storing the first type of digital data of the first data stream at addresses in the first memory means corresponding to the positions of the associated generally dark areas in the line of the picture;

first means included in the transceiver for cycling the first memory means, the first means being responsive to dense areas of the data corresponding to the generally dark areas of the picture to determine the first and last addresses of a particular one of the dense areas of the data;

second means included in the transceiver for storing the first address of the particular area;

third means included in the transceiver for storing the last address of the particular area;

fourth means included in the transceiver communicating with the second means, the third means, and the first memory means to transmit into the communication channel the first and last addresses of the particular area and the data in the particular area;

receiving means disposed at the second end of the communication channel and including means for receiving the first and last addresses of the particular area and the data in the particular area from the communication channel, and for constructing in the receiving means a second digital data stream similar to the first digital data stream; and reproducing means responsive to the second digital data stream to reproduce at least one line of the picture.

22. The facsimile system set forth in claim 21 wherein the receiving means includes a second transceiver operable in a receive mode of operation between the communication channel and the reproduction means, the second transceiver including:

fifth means for storing the first address of the particular area;

sixth means for storing the last address of the particular area;

second memory means for storing the data in the particular area;

eighth means connected to the fifth means and the second memory means for clocking the second memory means to the first address of the particular area is positioned at the input to the second memory means; and ninth means connected to the seventh means and the second memory means for clocking the data from the communication channel into the second memory means until the address at the input to the second memory means is the last address of the particular area.

23. The facsimile system set forth in claim 21 further comprising fifth means included in the first transceiver and connected to the first memory means, the second means and the third means, the fifth means having characteristics for comparing the address at the output of the first memory means with the last address of the particular area, and for providing a first signal enabling the data to be clocked from the first memory means when the compared addresses have a particular relationship.

24. The facsimile system recited in claim 23 wherein the fifth means provides a second signal inhibiting the clocking of the data from the memory means when the last address of the particular area is not greater than the first address of the particular area.

25. A facsimile system for viewing a picture at a first location and for reproducing the picture at a second location communicating with the first location through a telephone line, including;

scanning means at the first location for viewing at least one line of the picture and for providing a first digital data signal having first portions of the signal with characteristics dependent upon the areas of substantial darkness in the picture and second portions of the signal with characteristics dependent upon the areas of the substantial lightness in the picture;

a first transceiver disposed at the first location and operable in a transmit mode of operation between the scanning means and a telephone line;

a memory included in the first transceiver and responsive to the first digital data signal from the scanning means for storing the first digital data signal at addresses in the memory corresponding to the relative positions of the areas of substantial darkness and substantial lightness in the picture;

first means included in the first transceiver and communicating with the memory for storing the beginning address of a particular one of the first portions of the first digital data signal;

second means included in a first transceiver and communicating with the memory for storing the ending address of the particular one of the first portions of the first digital data signal;

third means included in a first transceiver and communicating with the first means, the second means and the memory for transmitting from the first means the beginning address, for transmitting from the second means the ending address, and for transmitting from the memory the particular portion of the first digital data signal defined by the beginning address stored in the second means and the ending addresss stored in the first means;

a second transceiver disposed at the second location and operable in a receive mode of operation to receive the transmitted portions of the digital data signal from the telephone line, the second transceiver having properties for storing the transmitted portions of the digital data signal and for reconstructing the second portion of the digital data signal to provide a second digital data signal having characteristics similar to the characteristics of the first digital data signal; and reproducing means disposed at the second location and responsive to the second digital data signal to reproduce at least one line of the picture.

26. The facsimile system recited in claim 25 wherein the memory is a first memory and the system further comprises:

fourth means communicating with the first memory and operable to indicate the address at the output of the first memory; and fifth means for comparing the address stored in the second means with the address stored in the fourth means and for clocking the data from the first memory until the address associated with the fifth means corresponds to the address stored in the second means.

27. The facsimile system recited in claim 26 wherein the fifth means comprises:

sixth means for cycling the first memory, the sixth means responsive to the first means and the fourth means to cycle the first memory until the address associated with the fourth means corresponds to the address stored in the first means; and a comparator communicating with the second means and the fourth means and providing a first signal when the address associated with the fourth means is less than the address stored in the second means and for providing a second signal when the address associated with the fourth means is equal to the address stored in the second means; whereby the sixth means is responsive to the first signal from the comparator to begin the cycling of the data from the first memory and is responsive to the second signal from the comparator to end the cycling of the data from the first memory so that only the particular one of the first portion of the first digital data signal is clocked from the memory.

* * * * *

UNITED STATES PATENT AND TRADEMARK OFFICE

CERTIFICATE OF CORRECTION

PATENT NO. : 3,909,515

DATED : September 30, 1975

INVENTOR(S) : ARTHUR W. EVANSEN

It is certified that error appears in the above-identified patent and that said Letters Patent are hereby corrected as shown below:

Column 1, line 34, change "date" to -- data --.

Column 1, line 52, change "exemple" to -- example --.

Column 2, line 36, after "therefore" insert -- more --.

Column 5, line 66, change "nest" to -- next --.

Column 6, line 26, change "modern" to -- modem --.

Column 7, line 23, change "locked" to -- clocked --.

Column 10, line 37, change "so" to -- to --.

Column 10, lines 45-46, after "can" insert -- be --; delete "FBN-N(found)" (second occurrence).

Column 10, line 54, change "apears" to -- appears --.

Column 13, line 43, after "sequence" omit the period "." and insert a colon -- : --.

Column 14, line 30, delete "C3'" (second occurrence); after "responsive" insert -- to --.

Column 15, line 25, after "insure" insert -- that --.

Column 15, line 27, change "hot" to -- not --.

UNITED STATES PATENT AND TRADEMARK OFFICE
CERTIFICATE OF CORRECTION

PATENT NO. : 3,909,515

DATED : September 30, 1975

INVENTOR(S) : ARTHUR W. EVANSEN

It is certified that error appears in the above-identified patent and that said Letters Patent are hereby corrected as shown below:

Column 15, line 48, before "the" (first occurrence) insert -- as --.

Column 15, line 60, after "signal" change the period to a comma.

Column 18, line 46, change "tight" to -- light --.

Column 18, line 56, change "recycling" to -- cycling --.

Column 18, line 60, change "date" to -- data --.

Column 19, line 30, change "second" to -- scanned --.

Column 19, line 63, change "pressure" to -- presence --.

Column 22, line 10, change "in" (second occurrence) to -- at --.

Column 22, line 17, change "addresss" to -- address --.

Column 26, line 6, after "means" (second occurrence) insert -- to --.

Signed and Sealed this

*twenty-fourth* Day of *February 1976*

[SEAL]

*Attest:*

RUTH C. MASON
*Attesting Officer*

C. MARSHALL DANN
*Commissioner of Patents and Trademarks*